March 17, 1959 J. T. ABDO 2,877,796
COMBINATION PRESSURE REGULATOR AND SHUT-OFF VALVE
Filed Nov. 29, 1955
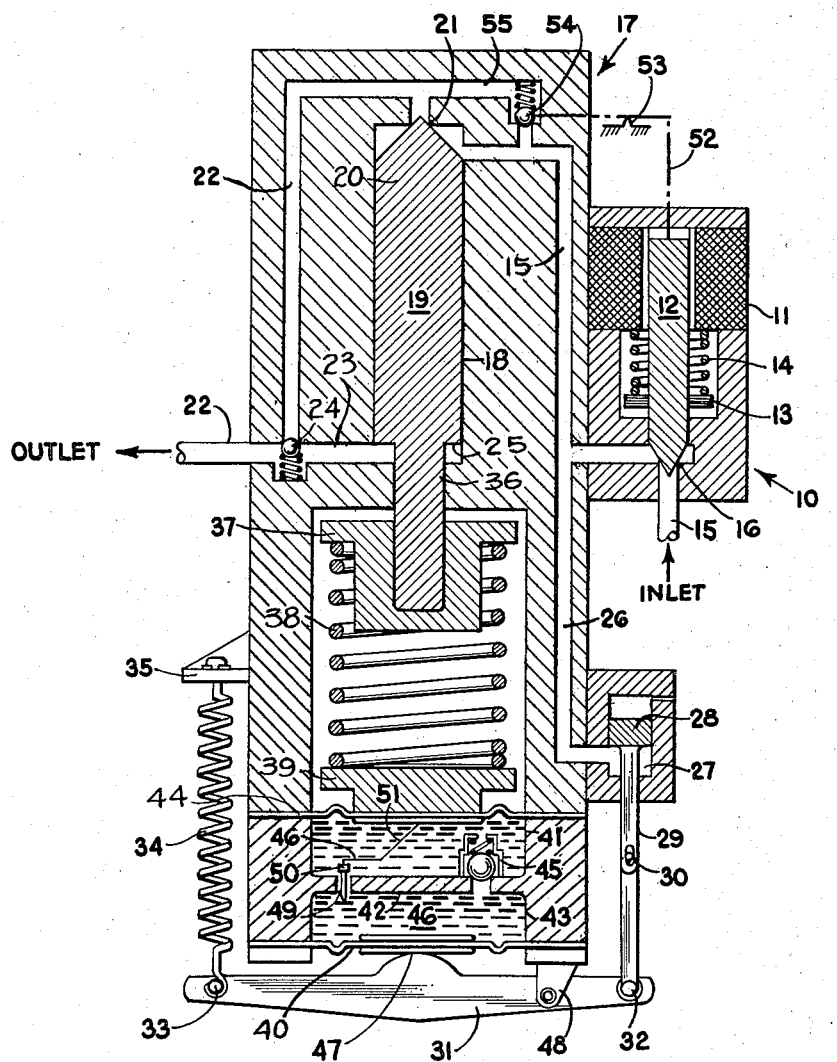
INVENTOR.
JOSEPH T. ABDO
BY Elliott & Pastoriza
ATTORNEYS

United States Patent Office 2,877,796
Patented Mar. 17, 1959

2,877,796

COMBINATION PRESSURE REGULATOR AND SHUT-OFF VALVE

Joseph T. Abdo, Los Angeles, Calif.

Application November 29, 1955, Serial No. 549,726

9 Claims. (Cl. 137—599)

This invention generally relates to a pressure controlling device, and more particularly to a valve mechanism for insertion between a high pressure inlet line and a controlled pressure outlet line, in which the rate of change of pressure at the outlet line with respect to the pressure at the inlet line is to be controlled over a given period of time. In a preferred embodiment, the invention also embodies a shut-off valve sub-assembly.

In most present day valve structures which function to control or limit pressure changes, the usual means of endeavoring to achieve this objective is through a time controlled, variable orifice opening, positioned between the high pressure inlet line and the controlled pressure outlet line. Thus, the speed of fluid flow from the inlet line to the outlet line is controlled in inverse proportion to the degree of the orifice opening, whereby the pressure at the outlet line will normally increase as the opening becomes greater and the speed of the fluid movement less. This type of system, although sufficient for certain well defined applications, is not feasible where any pressure build up occurs in the outlet line because of a constant or variable impedance to the flow. In other words, the valve mechanism in such a structure does not function to integrate the pressure changes in the outlet line, which may vary for other reasons, but only serves to increase the rate of pressure build up according to the degree of the orifice opening.

It is, therefore, an object of the present invention to provide a pressure control apparatus which functions directly in response to increments of pressure changes in an outlet line, to in turn control pressure therein over a given period of time.

More specifically, an object of the present invention is to provide a pressure regulating valve mechanism which will not only subject an outlet line to the pressure of an inlet line in a given period of time, but will also control the pressure rise in the outlet line directly according to the rate of incremental pressure changes therein.

A further object of the present invention is to provide a combined pressure regulator and shut-off valve which automatically will re-set itself in a closed, zero time position once the inlet line pressure is released.

A still further object is to provide a combination pressure regulator and shut-off valve which will fail-safe in the event of electrical or mechanical failures external of the apparatus.

A still further object of the present invention is to provide a combined pressure and regulator valve in accordance with the previous objects which may be simply and economically manufactured and which is adjustable to operate over a wide range of temperatures, pressures, and time periods.

These and other objects and advantages of the present invention are attained generally by providing an apparatus which includes a regulating valve means adapted for connection into a relatively high pressure, inlet line. Actuating means are associated with the regulating valve means and are adapted to move between a first and second position, to in turn, respectively, open and close the regulating valve means. The actuating valve means are so disposed as to have a first portion which is responsive to the fluid pressure in the inlet line, whereby the actuating means is urged toward the first position. In addition, the actuating means includes a second portion which is responsive to the fluid pressure in the outlet line so as to urge the actuating means toward the second position. The apparatus further includes a force means which is associated with the actuating means and is positioned to also urge the actuating means towards the second position. The force means is varied over a given period of time by a timing means, the latter being re-set to zero time automatically when the pressure in the inlet line is released.

With such a system, as soon as the apparatus is subjected to a given line pressure, the timing means will begin to operate to in turn vary the force means which is normally urging the actuating means towards the second position or the position in which the regulating valve is closed. As the timing means operates, the force means is designed to correspondingly decrease. Assuming the force means and inlet line pressure are substantially equal at the initial condition, a decrease in the force means from zero time will result in the line pressure tending to urge the actuating means towards the first position with a proportionate opening of the regulating valve. As this movement occurs, fluid will pass from the inlet line to the outlet line to establish a given pressure therein which will act to urge the actuating means toward the second position and to in turn effect a closing of the regulating valve. At the same time that the valve closing is occurring, the force means will be decreasing in response to the timing means to render the line pressure more effective and cause the actuating means to move toward the first position. It will thus be apparent that the actuating means, and correspondingly, the opening and closing of the regulating valve will be dependent on the rate of decrease of the force means and the rate of increase of the pressure in the outlet line. The apparatus may be designed such that the force means at its lower level at the end of a given period of time will not be sufficient together with the pressure in the outlet line to overcome the pressure of the inlet line on the actuating means, whereby the actuating means will remain in its first position and the valve will be fully open.

A better understanding of the present invention will be had by reference to the single drawing, in which a schematic layout thereof has been shown for illustrative purposes.

In the drawing there is shown a sectional, schematic view of the apparatus of the present invention including an inlet valve means in the form of a solenoid valve generally indicated at 10. The solenoid valve 10 is provided with a coil 11 disposed about a needle valve member 12. The member 12 has secured thereto a retainer 13 constraining a spring 14, which in turn biases the needle valve member 12 towards the inlet line 15, where it seats and closes off the inlet line at 16. Thus, in the event of failure of electrical energy to the coil 11, the solenoid valve 10 will fail-safe by the valve member 12 being spring biased towards a closed position.

The casing or housing for the pressure regulating portion of the apparatus is indicated at 17, and defines therein a cylinder 18, in which is slidably mounted an actuating means in the form of a differential piston 19. The piston 19 has an end area 20, which for purposes of this simplified schematic layout also doubles in function as a regulating valve member to close off the inlet line 15 at 21. Thus, by the end area 21 acting as a regulating valve means, the inlet line 15 is separated at this point from the outlet line designated by the numeral 22.

The outlet line 22 has communicating therewith a branch conduit 23, disposed above a check valve 24, which leads to an annular back surface area 25 of the differential piston 19.

The inlet line 15 additionally includes a branch circuit 26 which communicates with and terminates in an auxiliary cylinder 27. In the auxiliary cylinder 27, there is disposed a release piston 28 connected through a shaft 29 and hinged connection 30 to a control arm 31. The control arm 31 and the shaft are also hinged, as at 32.

At the opposite end of the control arm 31, another hinge 33 serves to connect thereto a return spring 34, which is in turn rigidly secured at 35 to the pressure regulating casing 17.

Extending from the back surface of the differential piston 19 is a shank 36 terminating in a force transmitting member 37 axially restraining a spring 38 in conjunction with another oppositely disposed force transmitting member 39.

The opposing force transmitting member 39 is coupled to a flexible diaphragm 40, whose edges are secured in the casing 17, and which serves as one end wall of a chamber 41. The other end wall of the chamber is defined by a partition 42, which is also common to another chamber 43. The chamber 43 has its other end wall 44 consisting of a similar flexible diaphragm. The partition 42 includes an opening in which is disposed a conventional check valve 45, preventing flow from chamber 41 to chamber 43 through this opening. The two chambers 41 and 43, under normal conditions are equally filled with a fluid 46, preferably a silicone oil.

The arm 31 includes a boss 47, which is designed for limited rotation about a pivot connection 48 securing the arm to the casing 17. The boss 47 functions to limit the outward movement of the diaphragm 44.

It will be apparent that any differential in pressure, as between the forces acting on the diaphragm 40 and on the diaphragm 44, will tend to cause a flow between the two chambers 41 and 43. Flow from chamber 43 to chamber 41 may occur through the check valve 45, which conversely (as mentioned heretofore) stops flow in the direction from chamber 41 to chamber 43. Flow from chamber 41 to chamber 43 may occur, however, through an orifice opening 49. If desirable for establishing a particular flow-time relationship, a variable area pin 50 or the like may be adapted to move with the diaphragm 40, as through a control connection 51, to act to restrict or open the orifice 49 as the diaphragm 40 moves towards the partition 42 and flow occurs from the chamber 41 to the chamber 43.

In operation, prior to the application of a given line pressure, the combined pressure regulator and shut-off valve of the present invention will have its operative parts in the positions shown in the drawing. Thus, the solenoid valve coil 11 will be deenergized and the valve member 12 will be seated at 16; the actuating means or differential piston 19 will be disposed so as to have the regulating valve end area 20 seated as at 21; the check valve 24 and the check valve 45 will be closed; the piston 28 will be in a released position, thereby permitting the full tension of the spring 34 to act on the arm 31 and correspondingly force the boss 47 against the diaphragm 44; and, the compression spring 38 will be in a given compressed state.

After line pressure is applied to the inlet line 15, the coil 11 may be energized to actuate the valve member 12 to its unseated position, overcoming the biasing action of the spring 14. Thereafter, the fluid will flow under the line pressure through the branch conduit 26 to force the piston 28 to its retracted or locked position. In this regard, it is, of course, necessary that the line pressure on the piston 28 be sufficient to overcome the force of the return spring 34, whereby the arm 31 may pivot about the connection 48.

As a consequence, the boss 47 will move outwardly permitting correspondingly limited outward movement of the diaphragm 44. At this time, the compression spring 38, through the force transmitting member 39, will begin to effect the movement of the silicone oil 46 from the chamber 41 through the orifice 49, and thereafter into the chamber 43 to force the diaphragm 44 in the outward direction. Thus, the spring 38 will be elongated at a rate in proportion to the rate of flow of the silicone oil 46 from the chamber 41 to the chamber 43 in accordance with the differential area of the orifice 49 and the variable area pin 50.

Also, under the initial application of line pressure, the fluid will flow through the inlet line 15 to act over the conical regulating valve end surface area 20 of the differential piston 19. The line pressure acting on the area 20 will tend to move the differential piston towards the bottom in the drawing to overcome the force acting on the shank 36 in the opposite direction, as a consequence of the spring 38. The spring 38 is designed to have a sufficient pre-load, however, to keep the end surface 20 seated at 21 at the instant of zero elapsed time until movement of the fluid 46 has actually begun to occur through the orifice 49.

Thereafter, the differential piston will tend to move towards the bottom of the drawing and correspondingly unseat its end surface regulating valve area 20. Fluid flow will then occur from the inlet line 15 into the outlet line 22, past the check valve 24, and also through the branch conduit 23 to the annular back surface 25 of the piston. As a consequence thereof, some undefined pressure will be established in the outlet line 22 at a particular instant of time after the valve has been set in operation by energizing the solenoid coil 11. It will be appreciated, however, that the pressure in the outlet line 22 will depend to a certain extent on the conditions of discharge therefrom. Generally, three possible sets of conditions may exist: first, discharge may occur into atmosphere or a large reservoir, whereby no pressure exists at discharge and there is, therefore, no possibility of pressure build up in the outlet line 22; second, discharge may occur through a restricted orifice or opening; and, third, discharge may occur through a variable opening or valve.

Assuming the first set of conditions with discharge to an enlarged volume or atmosphere, there will be no possibility for pressure build up in the outlet line 22, and, therefore, no appreciable force acting on the annular back surface 25. Consequently, the differential piston 19 will tend to move toward the bottom of the drawing and enlarge the regulating valve opening at 21, in correspondence to the rate at which the regulating spring 38 forces fluid from the chamber 41 to the chamber 43 in accordance with the variable cross sectional area as determined by the orifice 49 and pin 50. In such a system environment, there would be no requirement for pressure control in the outlet line 22, since the flow and pressure therein would be in accordance with the rate at which the differential piston or actuating means acted to unseat the regulating valve end surface 20, which in turn would be dependent upon the particular timing means used.

It is, therefore, not particularly advantageous to employ the present invention except where there is the likelihood or possibility of pressure build up in the outlet line 22, as under the second or third set of conditions. Thus, where discharge from the outlet line 22 occurs through restricted orifice or through a variable area orifice or opening, a pressure build up will necessarily occur in the outlet line 22 according to some undefined function. This function in most instances will not be directly related to the degree of the regulating valve opening, and consequently it will not be possible to control the pressure in the outlet 22 by the particular flow rate. It is for this reason, that a primary feature of the present invention resides in the provision of the differential piston 19 with a back surface area 25 subject to the pressure in the outlet line 22.

In this regard, it should be noted that the pre-load force of the spring 38 is substantially equivalent to the line pressure force acting over the end area 20, and that the various structures are designed such that the displacement of the spring 38 at its end on the force transmitting element 37 is insignificant relative to its possible displacement at its end acting on the member 39.

With these assumptions in mind, the explanation of the pressure regulation of this apparatus may be explained in conjunction with the following equations:

$$P_1A_1 = P_2A_2 + K(l-x)$$

where:

$P_1$ = line pressure
$A_1$ = end surface area 20
$P_2$ = pressure of outlet line 22
$A_2$ = annular back surface area 25
$K$ = constant of compression spring 38
$l$ = relaxed length of compression spring 38
$x$ = displacement of compression spring 38 from force transmitting member 37

It will thus be seen that as the pressure $P_2$, or the pressure in the outlet line 22, increases, there will be a tendency for the differential piston to move toward the top of the drawing and seat at 21; at the same time, as the displacement of the spring increases, and thus its effective force decreases, as defined by the change in $x$, in accordance with the fluid flow from chamber 41 to chamber 43, the differential piston 19 will have a tendency to move toward the bottom of the drawing and to open the regulating valve at 21. Therefore, in the beginning of the timing cycle, any appreciable increase in the pressure $P_2$ in the outlet line will act at $A_2$ on the back surface 25 to immediately move the regulating valve end 20 towards its closed position. As soon as the spring has been displaced another given unit of distance, a greater pressure $P_2$ will be required to bias the regulating valve 20 closed, and it will, therefore, open to permit an increase in pressure $P_2$ in the outlet line 22. The resultant increase force $P_2A_2$ will then be sufficient to again urge the regulating valve toward its closed position. In turn, there will be another increment of displacement of the spring, decreasing the spring force and again permitting the differential piston to move to the bottom of the drawing and open the regulating valve. Consequently, another increase in pressure $P_2$ will occur in the outlet line until it is sufficiently high to again cause a closing force to act on the regulating valve by an increased force on the back end surface $A_2$ at 25. This cycle will continue to be repeated in differential steps and in accordance with a desired rate of change function as determined by the nature of the variable orifice, until the spring 38 has reached its extended position and $x$ is equal to $l$ so that the spring force is substantially zero. At this time the regulating valve 20 will be fully unseated from 21 to permit substantially full line pressure in the outlet line 22.

Thus, the pressure build up will be limited to increments of pressure rise in the outlet 22 and not dependent upon the particular rate of fluid flow through the orifice opening at 21. In other words, even assuming that the discharge from the outlet line 22 were zero or that the outlet line were closed off, and no flow occurred through the outlet line, the differential piston would immediately actuate the valve 20 to a closed position as soon as there had been an increment of pressure build up.

When the system is to be shut down, the solenoid valve is merely de-energized and it in turn immediately closes off the pressure supply to the inlet line 15. In consequence, line pressure will be removed from the branch conduit 26, and the piston 28 will return to its released position, thereby permitting the return spring 34 to move the arm 31 so as to bring the boss 47 into contact with the diaphragm 44. The silicone oil 46 will then, in turn, be forced through the check valve 45 back into the chamber 41 to re-set the timing means. This movement of fluid will also serve to re-compress the regulating spring 38 and assure closing of the regulating valve 20 at 21, by moving the actuating means or differential piston 19 to the left. The check valve 24 by preventing flow back towards the end area 21 and yet permitting flow towards the end area 25, will also act to assure positive closing of the regulating valve end 20.

From a practical standpoint, it may also be desirable to provide a linkage 52 associated with the valve member 12. The linkage 52 upon closing of valve member 12 is adapted to pivot, as about a point 53, to operate a check valve 54 to an open position and thereby form a bypass passage 55 between the inlet line 15 and the outlet line 22. With this type of construction, any fluid pressure remaining in the inlet line 15 upon shutting down of the system will be relieved so that unlocking of the piston 28 will not be hampered.

An important feature of the invention is the fact that a predetermined pressure vs. time curve may be established by designing the requisite, variable orifice characteristic in conjunction with the particular force means employed.

It will be appreciated that many departures, changes and modifications may be made in the particular embodiment described without departing from the spirit and scope of this present invention for a combination pressure regulator and shut-off valve. Such changes are particularly apparent in the type of timing means utilized to control the rate of spring displacement. The diaphragm-chamber arrangement has been found particularly suitable for this purpose; however, it is also evident that a clock mechanism, an electric motor, or some type of electro-mechanical system in combination with the electrical supply to the solenoid coil 11 could be employed. For simplicity in the description of the invention the regulating valve 20 has been shown as an integral part of the actuating means or differential piston 19, and it has been assumed for this purpose that any variation in the end area 20 in the opening or closing of the regulating valve is not appreciable to vary the area $A_1$. It is, of course, feasible and practical to separate the regulating valve from the differential piston whereby this assumption need not be made.

From the foregoing description, it will be seen that the combined pressure regulator and shut-off valve of the present invention provides a means of controlling and limiting the pressure in an outgoing line over a given period of time without any necessity of measuring the flow in the outgoing line or being able to pre-determine the function corresponding to discharge conditions at the end of the outgoing line. In addition, the present invention accomplishes this purpose with a very simple and yet reliable structure.

What is claimed is:

1. In a combination pressure limiting and shut-off valve mechanism for interposition between a high pressure fluid inlet line and a control pressure outlet line, the combination including: regulating valve means connected into said inlet line; actuating means associated with said regulating valve means and adapted to move between a first position and a second position to respectively open and close said regulating valve means; said actuating means having a first portion responsive to the fluid pressure in said inlet line to urge said actuating means toward said first position; and said actuating means having a second portion responsive to the fluid pressure in said outlet line to urge said actuating means toward said second position; force means associated with said actuating means and adapted to urge said actuating means toward said second position; timing means acting to vary said force means over a given period of time, whereby the pressure in said outlet line may be controlled with respect to the inlet line pressure over said given period of time.

2. In a combination pressure limiting and shut-off valve mechanism for interposition between a high pressure fluid inlet line and a control pressure outlet line, the combination including: regulating valve means connected to said inlet line; piston means associated with said regulating valve means and adapted to move between a first position and a second position to respectively open and close said regulating valve means; said piston means having a first given end area subject to the fluid pressure in said inlet line tending to urge said piston toward said first position, and a second given opposed and area subject to the fluid pressure in said outlet line tending to urge said piston toward said second position; force means associated with said actuating means and adapted to urge said actuating means toward said second position; timing means acting to vary said force means over a given period of time, whereby the pressure in said outlet line may be controlled with respect to the inlet line pressure over said given period of time.

3. The subject matter of claim 2, in which said force means comprises a spring under compression at the beginning of said given period of time and adapted to elongate during said given period of time, whereby its effective force is correspondingly decreased.

4. A combination pressure limiting and shut-off valve for interposition between a high pressure fluid inlet line and a control pressure outlet line comprising: inlet valve means in said inlet line; regulating valve means connected into said inlet line downstream of said inlet valve means; piston associated with said regulating valve means and adapted to move between a first position and a second position to respectively open and close said regulating valve means; said piston means having a first given end area subject to the fluid pressure in said inlet line tending to urge said piston means towards said first position, and a second given opposed end area subject to the fluid pressure in said outlet line tending to urge said piston toward said second position; spring means associated with said piston means and adapted to urge said piston mean toward said second position; timing means acting to decrease the effective force of said spring means over a given period of time, whereby the pressure in said outlet line may be controlled with respect to the inlet pressure over said given period of time.

5. The subject matter according to claim 4, in which release means are associated with said timing means and function to unlock said timing means in response to application of inlet line pressure and to re-set said timing means upon closing off said inlet line pressure.

6. The subject matter of claim 5, in which said release means comprises: a release piston subject to the fluid pressure of said inlet line; and means operably connecting said release piston to said timing means, whereby said timing means begins its timing cycle upon application of the inlet line fluid pressure to said release piston.

7. The subject matter of claim 4, in which said timing means comprises a pair of fluid chambers having a common wall defining one end of each of said fluid chambers, said common wall having an orifice, and the opposite end of each of said fluid chambers being formed of a flexible diaphragm, whereby said spring means may act on the opposite end of one of said chambers to force fluid through said orifice to the other of said chambers, and correspondingly elongate said spring means over said given period of time.

8. The subject matter of claim 7, in which a variable area pin is disposed within said orifice, and in which said pin is connected for responsive movement to said opposite end of one of said chambers.

9. A valve apparatus connected to a high pressure inlet line for controlling pressure at an outlet line, comprising: valve means; means responsive to pressure at the inlet line tending to open said valve means; means responsive to pressure at the outlet line tending to close said valve means; force means tending to close said valve means; and, timing means acting to vary said force means over a given period of time.

References Cited in the file of this patent

UNITED STATES PATENTS

| 1,301,405 | Dexter | Apr. 22, 1919 |

FOREIGN PATENTS

| 497,582 | France | Sept. 18, 1919 |
| 750,620 | Great Britain | June 20, 1956 |